US012708995B2

(12) United States Patent
Tan et al.

(10) Patent No.: US 12,708,995 B2
(45) Date of Patent: Aug. 18, 2026

(54) HAND-HELD POWER TOOL HAVING AN ACTIVATION UNIT

(71) Applicant: Robert Bosch GmbH, Stuttgart (DE)

(72) Inventors: Yen Tiong Tan, Butterworth (MY); Khoo Ming Yang Calvin, Bayan Lepas (MY); Han Hoong Sebastian Chin, Tanjong Bungah (MY)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/552,631

(22) PCT Filed: Mar. 15, 2022

(86) PCT No.: PCT/EP2022/056743
§ 371 (c)(1),
(2) Date: Sep. 26, 2023

(87) PCT Pub. No.: WO2022/214283
PCT Pub. Date: Oct. 13, 2022

(65) Prior Publication Data

US 2024/0157538 A1 May 16, 2024

(30) Foreign Application Priority Data

Apr. 7, 2021 (DE) ..................... 10 2021 203 415.2

(51) Int. Cl.
*B25B 21/00* (2006.01)
*B25F 5/02* (2006.01)

(52) U.S. Cl.
CPC ................ *B25F 5/02* (2013.01); *B25B 21/00* (2013.01)

(58) Field of Classification Search
CPC ............... B25F 5/02; B25F 5/00; B25B 21/00
(Continued)

(56) References Cited

U.S. PATENT DOCUMENTS 3,572,181 A * 3/1971 Schlegel .............. B25H 1/0085 408/16
4,069,774 A * 1/1978 Lofgren ............... A01C 11/006 172/4
(Continued)

FOREIGN PATENT DOCUMENTS

DE 10 2010 053 314 A1 5/2012
DE 102011004364 A1 * 8/2012 ............. B25B 23/14
(Continued)

OTHER PUBLICATIONS

International Search Report corresponding to PCT Application No. PCT/EP2022/056743, mailed Jun. 24, 2022 (German and English language document) (6 pages).

*Primary Examiner* — Robert F Long
(74) *Attorney, Agent, or Firm* — Maginot, Moore & Beck LLP

(57) ABSTRACT

A hand-held power tool, in particular a screwdriver, includes: an elongate housing in which a drive unit having at least one drive motor for driving a tool receptacle is arranged, the tool receptacle being designed to accommodate an insertion tool; and an activation unit for activating the drive motor, the drive motor being activated by the insertion tool which is located in the tool receptacle acting upon, in particular along a longitudinal axis of the elongate housing, a workpiece to be worked on. The activation unit has a first activation element for activating the drive motor at a first speed and a second activation element for activating the drive motor at a second speed, the first speed being less than the second speed.

17 Claims, 12 Drawing Sheets

(58) Field of Classification Search
USPC ..... 173/1–2, 13, 18–20, 184, 25–31, 38–39, 173/45–53
See application file for complete search history.

(56) References Cited

U.S. PATENT DOCUMENTS

| | | | | | |
|---|---|---|---|---|---|
| 4,601,351 | A * | 7/1986 | Hartwig | B25D 11/125 173/205 |
| 4,673,043 | A * | 6/1987 | Greppmair | B25D 17/11 173/211 |
| 4,813,312 | A * | 3/1989 | Wilhelm | B25B 23/147 81/469 |
| 4,911,588 | A * | 3/1990 | Ikemoto | B23G 1/16 408/137 |
| 5,154,242 | A * | 10/1992 | Soshin | B25B 23/147 173/180 |
| 5,393,288 | A * | 2/1995 | Miyasaka | G01B 7/023 483/31 |
| 5,557,990 | A | 9/1996 | Shin | |
| 5,736,703 | A * | 4/1998 | Kim | G06F 3/0485 200/1 B |
| 6,158,929 | A * | 12/2000 | Fisher | B25B 23/0064 408/202 |
| 6,923,268 | B2 * | 8/2005 | Totsu | B25B 21/00 173/4 |
| 2003/0196824 | A1 * | 10/2003 | Gass | B23B 45/008 173/131 |
| 2004/0040727 | A1 * | 3/2004 | Miller | B25F 5/026 173/2 |
| 2004/0089528 | A1 * | 5/2004 | Totsu | B25B 23/147 200/293.1 |
| 2004/0182587 | A1 * | 9/2004 | May | B25B 23/1405 173/176 |
| 2006/0185866 | A1 * | 8/2006 | Jung | B25D 16/006 173/48 |
| 2007/0023333 | A1 * | 2/2007 | Mouhebaty | B01D 35/14 116/281 |
| 2008/0289839 | A1 * | 11/2008 | Hricko | B25B 23/0064 173/4 |
| 2009/0120770 | A1 * | 5/2009 | Hammerstingl | B25D 17/043 200/61.85 |
| 2010/0282485 | A1 * | 11/2010 | Puzio | B25B 23/0035 173/171 |
| 2011/0278035 | A1 * | 11/2011 | Chen | H02P 23/20 173/170 |
| 2012/0090863 | A1 * | 4/2012 | Puzio | B25B 21/002 173/2 |
| 2013/0140050 | A1 * | 6/2013 | Eshleman | B25B 23/0064 173/1 |
| 2015/0298305 | A1 | 10/2015 | Öberg | |
| 2017/0109488 | A1 * | 4/2017 | Still | A61B 34/30 |
| 2017/0197305 | A1 * | 7/2017 | Rastegar | B25F 3/00 |
| 2018/0091145 | A1 * | 3/2018 | Dey, IV | G01D 5/202 |
| 2018/0185993 | A1 * | 7/2018 | Hita | B25B 21/00 |
| 2020/0078918 | A1 * | 3/2020 | Yoshikane | B25F 5/026 |
| 2020/0122311 | A1 * | 4/2020 | Tsuruta | H01H 13/66 |
| 2021/0154820 | A1 * | 5/2021 | Bianco | G01C 19/00 |
| 2021/0186268 | A1 * | 6/2021 | Tareen | A47J 43/10 |
| 2022/0014128 | A1 * | 1/2022 | Dai | B25B 23/1475 |
| 2022/0362916 | A1 * | 11/2022 | Fünfer | B25D 17/06 |
| 2022/0410283 | A1 * | 12/2022 | Kitamura | B23B 45/02 |
| 2024/0116160 | A1 * | 4/2024 | Ringler | B25F 5/02 |
| 2024/0157538 | A1 * | 5/2024 | Tan | B25B 21/00 |

FOREIGN PATENT DOCUMENTS

| | | | | |
|---|---|---|---|---|
| DE | 112017006677 | T5 * | 9/2019 | B25B 23/00 |
| DE | 102019213742 | A1 * | 3/2021 | B25F 5/02 |
| EP | 1775074 | A1 * | 4/2007 | B25B 23/147 |
| EP | 2457693 | A2 * | 5/2012 | B25B 21/00 |
| JP | 2000246660 | A * | 9/2000 | |
| WO | 2014/056905 | A1 | 4/2014 | |

* cited by examiner

HAND-HELD POWER TOOL HAVING AN ACTIVATION UNIT

This application is a 35 U.S.C. § 371 National Stage Application of PCT/EP2022/056743, filed on Mar. 15, 2022, which claims the benefit of priority to Serial No. DE 10 2021 203 415.2, filed on Apr. 7, 2021 in Germany, the disclosures of which are incorporated herein by reference in their entirety.

BACKGROUND

The present disclosure relates to a hand-held power tool, in particular a screwdriver, having an elongate housing, in which a drive unit having at least one drive motor for driving a tool receptacle is arranged, the tool receptacle being designed to accommodate an insertion tool, and an activation unit for activating the drive motor, the drive unit being activated by the insertion tool which is located in the tool receptacle acting upon, in particular along a longitudinal axis of the elongate housing, a workpiece to be worked on.

Such a hand-held power tool, designed as a straight screwdriver with an elongate housing, is known from the prior art. The straight screwdriver comprises a drive motor in the housing for driving an associated tool receptacle. Action upon a workpiece being worked on in the insertion tool, which is arranged in the tool receptacle, results in activation of a drive unit or a switching element associated with the drive motor at a specified speed.

SUMMARY

The disclosure relates to a hand-held power tool, in particular a screwdriver, having an elongate housing, in which a drive unit having at least one drive motor for driving a tool receptacle is arranged, the tool receptacle being designed to accommodate an insertion tool, and an activation unit for activating the drive motor, the drive unit being activated by the insertion tool which is located in the tool receptacle acting upon, in particular along a longitudinal axis of an elongate housing, a workpiece to be worked on. The activation unit comprises a first activation element for activating the drive motor at a first speed and a second activation element for activating the drive motor at a second speed, wherein the first speed is less than the second speed.

The disclosure therefore enables the provision of a hand-held power tool in which the drive unit, which can be operated at a first or second speed, can be operated by the insertion tool, which is located in the tool receptacle, acting upon a workpiece to be worked on. An application-specific speed of the drive motor required for operation can therefore be easily selected.

Preferably, the tool receptacle is movable along the longitudinal axis relative to the drive motor to activate the first and/or second activation element.

Simple and straightforward actuation of the activation unit can therefore be enabled.

The first and second activation elements are preferably arranged on a transmission housing associated with the drive unit, in particular on an end face of the transmission housing facing the tool receptacle.

A stable and robust arrangement of the activation elements can therefore be enabled.

According to one embodiment, a drive unit housing is provided within the elongate housing for the axially immovable arrangement of the tool receptacle and the drive unit, whereby the drive unit housing is movable along the longitudinal axis relative to a control electronics means, the control electronics means being arranged on an end of the elongate housing opposite the tool receptacle.

Secure and reliable activation of the activation unit can therefore be enabled in a simple manner.

Preferably, the first activation element is arranged on the drive unit housing.

Activation of the first activation element can therefore be easily and straightforwardly effected by moving the drive unit housing.

Preferably, the second activation element is arranged along the longitudinal axis between the drive unit and the control electronics means.

A suitable arrangement of the second activation element can therefore be enabled in a simple manner.

According to one embodiment, the first and second activation elements are arranged along the longitudinal axis between the drive unit and the control electronics means.

An alternative arrangement of the first and second activation elements can therefore be enabled.

Preferably, a first spring element is associated with the first activation element and a second spring element is associated with the second activation element, wherein the first and second spring elements have different spring rates, and wherein the first and second spring elements can be compressed by being acted upon, to enable actuation of the first or second activation element and thus activation of the drive motor at the speed associated with the first or second activation element.

Safe and reliable activation of the drive motor via the activation elements can therefore be enabled.

Preferably, at least one spring element is arranged on an outer circumference of the tool receptacle, an inner receptacle of the tool receptacle, an outer circumference of a drive unit housing of the drive unit, and/or between the drive unit and a control electronics means arranged at an end of the elongate housing opposite the tool receptacle.

A suitable arrangement of at least one spring element can therefore be enabled in a simple and uncomplicated manner.

Preferably, the first and/or second spring elements are designed as a spiral spring or leaf spring.

A stable and robust spring element can therefore be provided.

Provided according to one embodiment is a spring retaining ring comprising a first support bar at a first distance for arrangement of the first spring element, and a second support bar at a second distance for arrangement of the second spring element, the first distance being greater than the second distance.

A spring retaining ring can therefore be provided, on which the first and second spring elements can be securely and reliably arranged. Moreover, torques associated with the first and second speeds can thus be enabled.

According to one embodiment, a separate switch is associated with the first and/or second activation elements, wherein activation of the drive motor at the speed associated with the first and/or second activation elements occurs by an operation of the separate switch.

Alternative activation of the first and/or second activation elements can therefore be easily and straightforwardly enabled.

According to one embodiment, the first and/or second activation element is designed as a sensor, which detects a movement of the tool receptacle and/or a drive unit housing of the drive unit along the longitudinal axis, in which case the control electronics means controls a specified speed of the drive motor as a function of a detected movement.

An alternative activation of the first and/or second activation elements can therefore be enabled in a simple manner.

Preferably, the first and/or second activation elements are designed as on or off switches.

A secure and reliable activation element can therefore be provided.

Moreover, the present disclosure provides a method for operating a hand-held power tool, in particular a screwdriver. The hand-held power tool comprises an elongate housing, in which a drive unit having at least one drive motor for driving a tool receptacle is arranged, the tool receptacle being designed to accommodate an insertion tool, and an activation unit for activating the drive motor, the drive unit being activated by the insertion tool which is located in the tool receptacle acting upon, in particular along a longitudinal axis of the elongate housing, a workpiece to be worked on. The method is characterized by the following steps:

activating a first activation element for activating the drive motor at a first speed, and activating a second activation element for activating the drive motor at a second speed, the first speed being less than the second speed.

The disclosure thus enables the provision of a method for operating a hand-held power tool in which, by activating a first or a second activation element, the drive motor of the hand-held power tool can be operated at a first or a second speed. An application-specific speed of the drive motor required for operation can therefore be easily selected.

BRIEF DESCRIPTION OF THE DRAWINGS

The disclosure is explained in further detail in the following description with reference to exemplary embodiments shown in the drawings. Shown are.

DETAILED DESCRIPTION

Figure 1:
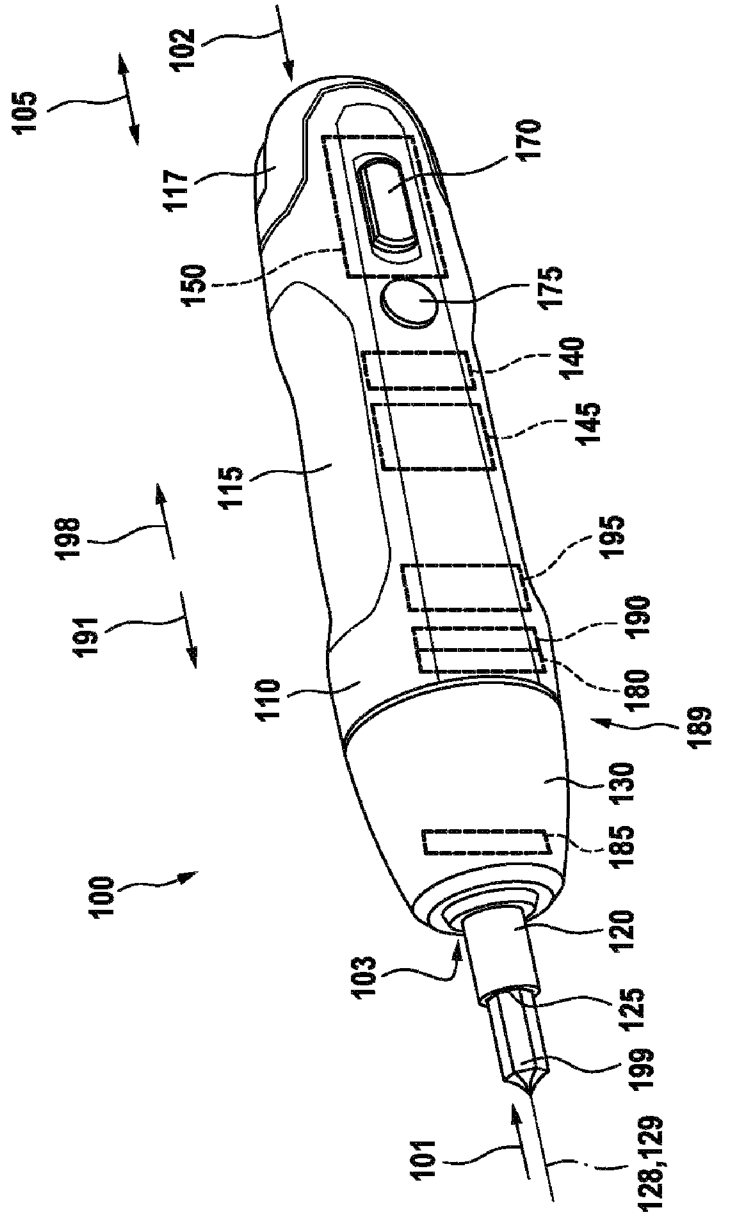
FIG. 1 a side view of a hand-held power tool according to the disclosure having an activation unit with a first and second activation element, FIG. 2 a schematic view of the hand-held power tool in FIG. 1 with the activation unit in FIG. 1, FIG. 3 a longitudinal section through a drive unit associated with the hand-held power tool in FIG. 1 with the activation unit in FIG. 2 in the deactivated state of the drive motor, FIG. 4 a longitudinal section through the drive unit in FIG. 2 and FIG. 3 with the drive motor activated at a first speed, FIG. 5 a longitudinal section through the drive unit in FIG. 2 to FIG. 4 with the drive motor activated at a second speed, FIG. 6 a longitudinal section through a spring retaining ring associated with the drive unit in FIG. 1 to FIG. 5, FIG. 7 a schematic view of the hand-held power tool in FIG. 1 with an activation unit according to another embodiment, FIG. 8 a longitudinal section through the drive unit in FIG. 1 and FIG. 7 with the activation unit in FIG. 7 in the deactivated state of the drive motor, FIG. 9 a longitudinal section through the drive unit in FIG. 7 with the drive motor activated at a first speed, FIG. 10 a longitudinal section through the drive unit in FIG. 7 and FIG. 8 with the drive motor activated at a second speed, FIG. 11 a schematic view of the hand-held power tool in FIG. 1 with the activation unit according to an alternative embodiment, and FIG. 12 a schematic view of the hand-held power tool in FIG. 1 with the activation unit according to another embodiment.

Elements having the same or a comparable function are provided with the same reference characters in the drawings and are described in detail only once.

FIG. 1 illustrates an exemplary hand-held power tool 100, which by way of illustration comprises an elongate housing 110. By means of the elongate housing 110, the hand-held power tool 100 is therefore, e.g., designed in what is referred to as a "straight shape." The hand-held power tool 100 is preferably designed as a screwdriver, in particular as a straight screwdriver. According to one embodiment, the hand-held power tool 100 can be mechanically and electrically connected to a drive unit 150 for network-independent power supply. The power supply unit 150 is preferably designed as a battery pack.

Preferably at least one drive motor 140 for driving a tool receptacle 120 is arranged in the elongate housing 110. The tool receptacle 120 is preferably associated with an internal receptacle 125 for accommodating an insertion tool 199, e.g. a screwdriver bit or drill. Preferably, the tool receptacle 120 is an internal hexagonal receptacle for a screwdriver bit. Alternatively, the tool receptacle 120 can also be designed as an external receptacle, in particular as an external square receptacle.

The elongate housing 110 preferably comprises a cylindrical base body having a first axial end 101 and an opposite second axial end 102, the tool receptacle 120 being arranged, e.g., in the region of the first axial end 101. By way of illustration, a longitudinal direction 105 of the elongate housing 110 is designed between the first and second axial ends 101, 102. The tool receptacle 120 is preferably associated with an axis of rotation 129.

In the hand-held power tool 100 shown in FIG. 1, the tool receptacle 120, the drive motor 140, and the housing 110 having a handle area 115 and a cover 117 are arranged along a common axis of rotation, preferably the axis of rotation 129 of the tool receptacle 120. Preferably, all elements of the hand-held power tool 100 are arranged in the elongate housing 110. Thus, compared to a hand-held power tool with a pistol-shaped housing in which the battery pack is arranged perpendicular to the drive motor, which is sufficiently known from the prior art, the battery pack 150 is also preferably arranged in the housing 110 in the hand-held power tool 100.

According to one embodiment, a transmission 145 is associated with the drive motor 140. The transmission 145 is preferably designed as a planetary gear train.

Furthermore, a sliding switch 170 is preferably provided, which is arranged on the housing 110 in order to activate a reversing operation of the drive motor 140. The housing 110 preferably also comprises a torque adjustment sleeve 130 at its axial end 101. Moreover, the cover 117 is preferably arranged on the axial end 102 of the elongate housing 110 facing away from the tool receptacle 120.

According to one embodiment, an activation unit 189 is provided for activating the drive motor 140 through a biasing of the tool receptacle 120 or of the insertion tool 199 arranged or accommodated in the tool receptacle 120 against a workpiece to be worked on. A corresponding axial biasing of the tool receptacle 120 or the insertion tool 199 and thus the tool receptacle 120, i.e. biasing in an axial direction, is preferably carried out in the longitudinal direction 105 against the workpiece to be worked on. Preferably an, in particular axial, biasing of the tool receptacle 120 or the insertion tool 199 arranged therein of at least 0.1 Nm activates the drive motor 140. Generally, in the present description, the term "axially" or "in the axial direction" refers to a direction in the longitudinal direction 105 of the housing 110, in particular a direction coaxial or parallel to the axis of rotation 129 of the tool receptacle 120.

According to the disclosure, the activation unit 189 comprises a first activation element 185 for activating the drive motor 140 at a first speed and a second activation element 195 for activating the drive motor 140 at a second speed. Preferably, the first and/or second activation elements 185, 195 are designed as on or off switches.

Preferably, the first speed is less than the second speed. The first speed in this case preferably ranges from 30% to 70% from a maximum speed of the drive motor 140, preferably at 50% of the maximum speed of the drive motor 140. Moreover, the second speed preferably ranges from 70% to 100% of the maximum speed of the drive motor 140, preferably at 100% the maximum speed of the drive motor 140. It should be noted that the stated ranges of the first and second speed are merely exemplary in nature and should not be seen as a limitation of the present disclosure.

The activation unit 189 is preferably arranged along a longitudinal axis 128 between the drive motor 140 and the first axial end 101 of the housing 110 or an end face 103 of the housing 110. By way of illustration, the longitudinal axis 128 corresponds to the axis of rotation 129. According to one embodiment, the tool receptacle 120 is movable along the longitudinal axis 128 relative to the drive motor 140 to activate the first and/or second activation elements 185, 195.

Preferably, a first spring element 180 is associated with the first activation element 185 and a second spring element 190 is associated with the second activation element 195. The first and second spring elements 180, 190 preferably have different spring rates.

Preferably, the first and second spring elements 180, 190 are compressible by biasing, preferably in a direction 198 indicative of the drive motor 140, to allow actuation of the first or second activation elements 185, 195 and thus activation of the drive motor 140 at the speed associated with the first or second activation elements 185, 195. Preferably, the first and/or second spring elements 185, 195 are designed as a spiral spring or leaf spring.

Alternatively, or optionally, a separate switch 175 is associated with the first and/or second activation elements 185, 195. An operation of the separate switch 175 by a user preferably activates the drive motor 140 at the speed associated with the first and/or second activation elements 185, 195.

By way of illustration, only a separate switch 175 is shown in FIG. 1, but a separate switch 175 can also be associated with each activation element 185, 195. Furthermore, the separate switch 175 is by way of illustration arranged in the area of the slide switch 170. It should be noted that the separate switch 175 can also be arranged at any other desired location of the housing 110 of the hand-held power tool 100.

Figure 2:
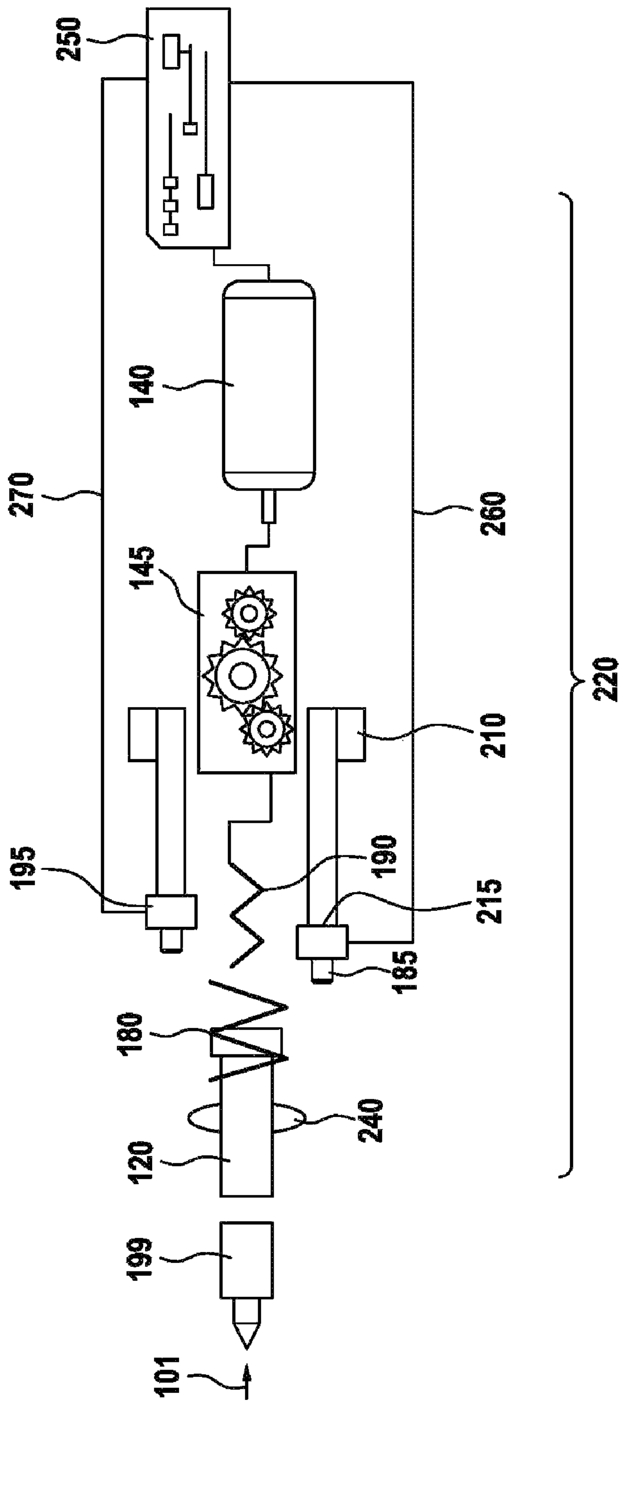

FIG. 2 illustrates the hand-held power tool 100 in FIG. 1 with an exemplary drive unit 220. The drive unit 220 comprises at least the drive motor 140. According to one embodiment, the drive unit 220 is further associated with a transmission 145. In the illustration, the activation unit 189 is arranged between the insertion tool 199 and the tool receptacle 120. The activation unit 189 preferably comprises an actuating element 240 for actuating the activation elements 185, 195 in FIG. 1. The actuating element 240 is preferably arranged on an outer circumference (371 in FIG. 3) of the tool receptacle 120.

In accordance with one embodiment, the first and second activation elements 185, 195 are arranged on a transmission housing 210 associated with the drive unit 220. In particular, the first and second activation elements 185, 195 are preferably arranged on an end face 215 of the transmission housing 210 facing the tool receptacle 120. The two activation elements 185, 195 are in this case preferably arranged on an end face 215 of the transmission housing 210 facing the insertion tool 199 and the first end 101 respectively.

Furthermore, FIG. 2 illustrates the arrangement of the spring elements 180, 190 between the transmission 145 and the actuating element 240. By way of illustration, the two spring elements 180, 190 are designed as spiral springs. In particular, the first spring element 180 is preferably arranged in an internal receptacle (370 in FIG. 3) of the tool receptacle 120. Furthermore, the second spring element 190 is preferably arranged on an outer circumference (371 in FIG. 3) of the tool receptacle 120.

Preferably, the control electronics means 250 is arranged in the region of a side of the drive motor 140 facing the second axial end 102 of the housing 110. The two activation elements 185, 195 are each connected to the control electronics means 250 via a connection 260, 270. In particular, the first activation element 185 is preferably connected to the control electronics means 250 via a connection 260, and the second activation element 195 is connected to the control electronics means 250 via a connection 270. Signals are in this case preferably sent to the control electronics means 250 via the connections 260, 270 in order to activate the respectively associated speed of the drive motor 140.

Preferably, at least the second activation element 195 is arranged along the longitudinal axis 128 in FIG. 1 between the drive unit 220 and the control electronics means 250. By way of illustration, the first and second activation elements 185, 195 are arranged along the longitudinal axis 128 in FIG. 1 between the drive unit 220 and the control electronics means 250.

When the tool receptacle 120 or the insertion tool 199 arranged therein is acted upon against a workpiece to be worked on, preferably the first spring element 180 is first compressed, thereby actuating or activating the first activation element 185 by the actuating element 240. As a result, the drive motor 140 is activated at the first speed. Acting upon further with a higher force preferably compresses the second spring element 190, thereby activating the second activation element 195 and operating the drive motor 140 at the second speed. By way of illustration, the two activation elements 185, 195 are arranged along the longitudinal axis 128 in FIG. 1 at a different distance from the actuating element 240. Preferably, the activation elements 185, 195 are designed as a motor on-switch.

Figure 3:
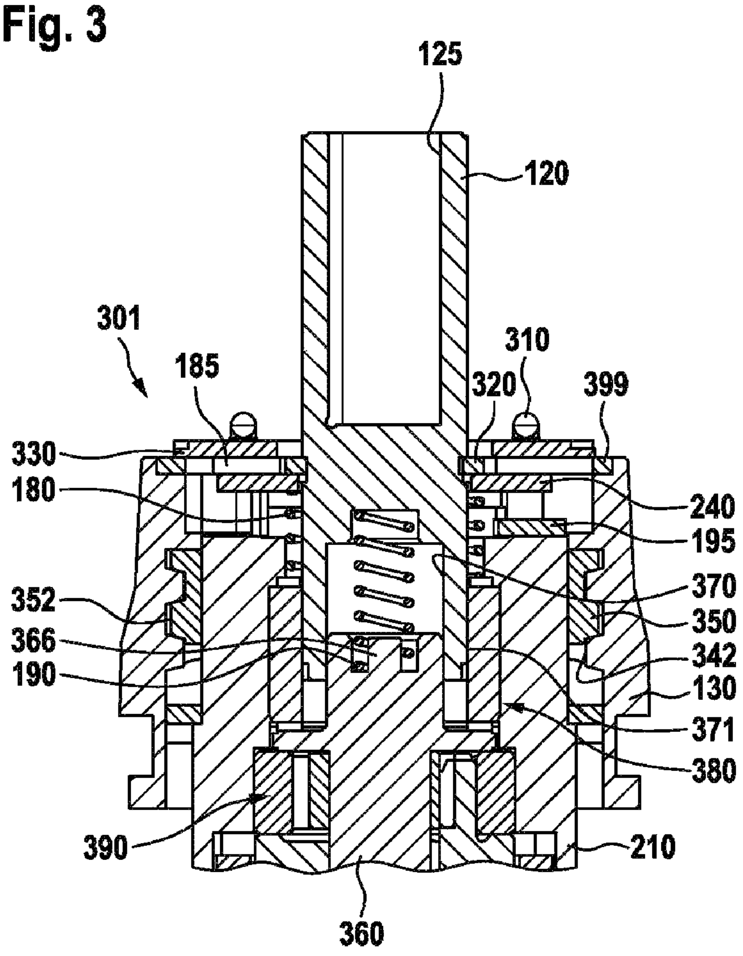

FIG. 3 shows the drive unit 220 of the hand-held power tool in FIG. 1 and FIG. 2 with the activation unit 189 in an exemplary resting position 301, i.e., with the drive motor 140 disabled. In the embodiment shown in FIG. 3, the first activation element 185 is by way of illustration arranged along the longitudinal axis 128 in FIG. 1 between a printed circuit board 330 arranged on the end face 103 of the hand-held power tool 100 and the actuating element 240. Preferably, the first activation element 185 is designed as an motor off-switch. The second activation element 195 is by way of illustration arranged on the end face 215 of the transmission housing 210. Preferably, in the embodiment shown, the second activation element 195 is designed as a motor on-switch.

The printed circuit board 330 preferably comprises one or more LEDs 310 for work field lighting. Preferably, the printed circuit board 330 is arranged via a retaining element 399 in the housing 110, particularly in the torque adjustment sleeve 130. In this case, the retaining element 399 preferably comprises a disk-shaped base body with a recess. The recess is designed to allow the first activation element 185 to be arranged therein.

Also preferably provided is a torque coupling having a torque adjustment apparatus, which comprises the torque adjustment sleeve 130 for adjusting a specified torque, and having a spring retaining ring 350. The torque adjustment sleeve 130 is in this case preferably directly connected to the spring retaining ring 350 via a dovetail 342, 352. The torque adjustment sleeve 130 in this case preferably comprises an internal threading 342 on its inner circumference, and the spring retaining ring 350 has an external threading 352 on its outer circumference for forming the dovetail 342, 352.

Moreover, the transmission 210 preferably comprises an output element 360, the output element 360 preferably engaging with an internal receptacle 370 of the tool receptacle 120. Furthermore, the tool receptacle 120 is preferably axially slidable with respect to the output element 360. Preferably, the output element 360 comprises an internal receptacle for partially accommodating the second spring element 190. The second spring element 190 is in this case preferably arranged between the output element 360, in particular the internal receptacle of the output element 360, and the tool receptacle 120, in particular the internal receptacle 370 of the tool receptacle 120. Preferably, the internal receptacle of the output element 360 comprises a central positioning pin 366 designed so as to center the second spring element 190 in the internal receptacle of the output drive 360. Preferably, a single second spring element 190 is provided. However, a plurality of spring elements 190 arranged in series can also be arranged in the internal receptacle of the tool receptacle 120.

FIG. 3 further illustrates an arrangement of a bearing element 380 between the transmission housing 210 and an outer circumference 371 of the tool receptacle 120. Also shown is the arrangement of the actuating element 240 on the outer circumference 371 of the tool receptacle 120, as well as the axial fixation of the actuating element 240 by a securing element 320 arranged in a positioning groove. Preferably, a spindle lock 390 is associated with the output element 360. Such a spindle lock 390 is sufficiently known from the prior art, and a detailed description is thus omitted here.

Figure 4:
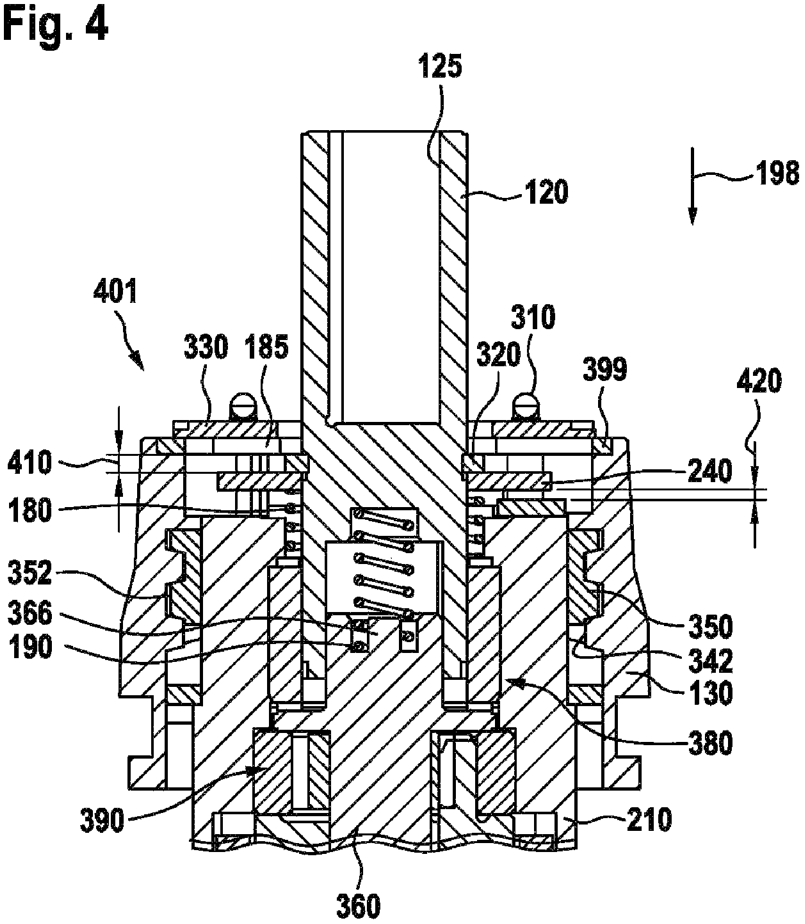

FIG. 4 shows the tool receptacle 120 with the activation unit 189 in FIG. 3, with the drive motor 140 activated at a first speed stage 401, with the drive motor 140 driven at the first speed. The actuating element 240 is in this case preferably spaced apart from the first activation element 185 by a distance 410. Furthermore, the actuating element 240 is preferably spaced apart from the second activation element 195 by a distance 420. The first spring element 180 is in this case compressed by a biasing of the biasing element 240 and the second spring element 190 is not compressed.

To activate the drive motor 140 at the first speed, the tool receptacle 120, or the insertion tool 199 arranged in the tool receptacle 120, is biased against a workpiece to be worked on, causing the tool receptacle 120 to slide in the direction 198 towards the drive motor 140. The actuating element 240 is in this case preferably moved away from the first activation element 185 and toward the second activation element 195, thereby generating distance 410, and the first activation element 185 designed as the motor off-switch activates the drive motor 140 at the first speed.

Figure 5:
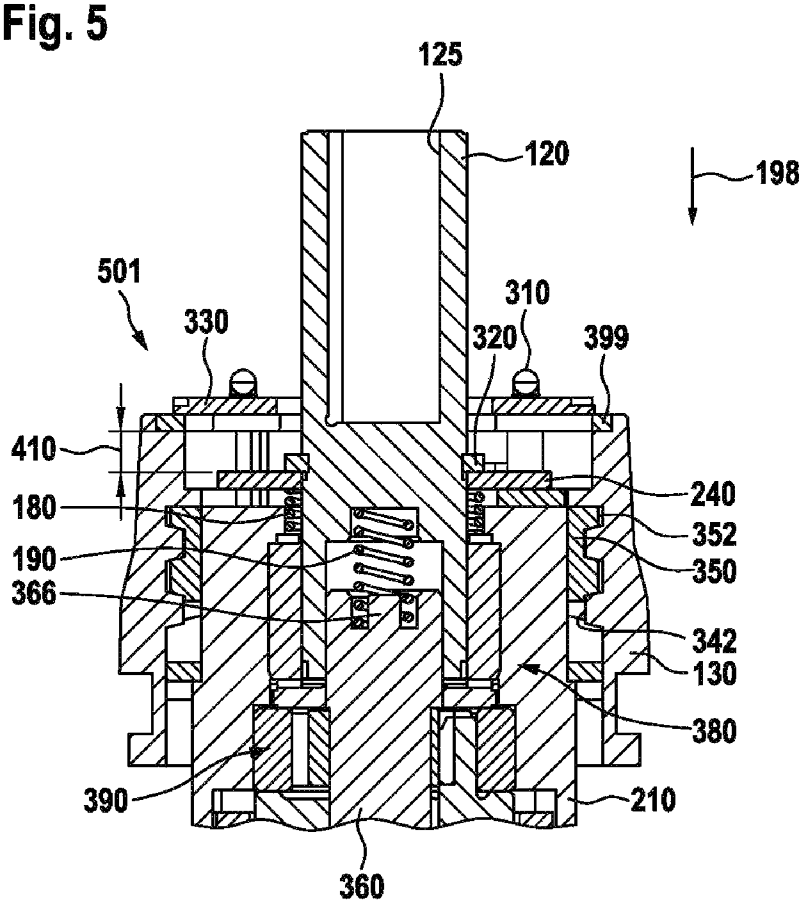

FIG. 5 shows the tool receptacle 120 with the activation unit 189 in FIG. 3 and FIG. 4, with the drive motor 140 activated at a second speed stage 501, in which the drive motor 140 is driven at the second speed. The actuating element 240 is in this case preferably spaced apart from the first activation element 185 by the distance 410 in FIG. 4, but in the second speed stage 501 in FIG. 5, distance 410 is greater than in FIG. 4. Furthermore, preferably, the actuating element 240 adjoins the second activation element 195 such that the distance 420 in FIG. 4 between the actuating element 240 and the second activation element 195 is reduced to at least approximately zero. The first spring element 180 and the second spring element 190 are in this case compressed by biasing. Preferably, the actuating element 240 biases the first spring element 180 and the tool receptacle 120 biases the second spring element 190 such that it is also compressed compared to FIG. 4.

To activate the drive motor 140 at the second speed, the tool receptacle 120, or the insertion tool 199 arranged in the tool receptacle 120, is biased more strongly against a workpiece to be worked on compared with FIG. 4, causing the tool receptacle 120 to slide in the direction 198 towards the drive motor 140. The actuating element 240 is thereby moved away from the first activation element 185 and adjoins the second activation element 195, thereby increasing the distance 410 as compared to FIG. 4, then activating the second activation element 195 designed as the motor on-switch and activating the drive motor 140 at the second speed.

Figure 6:
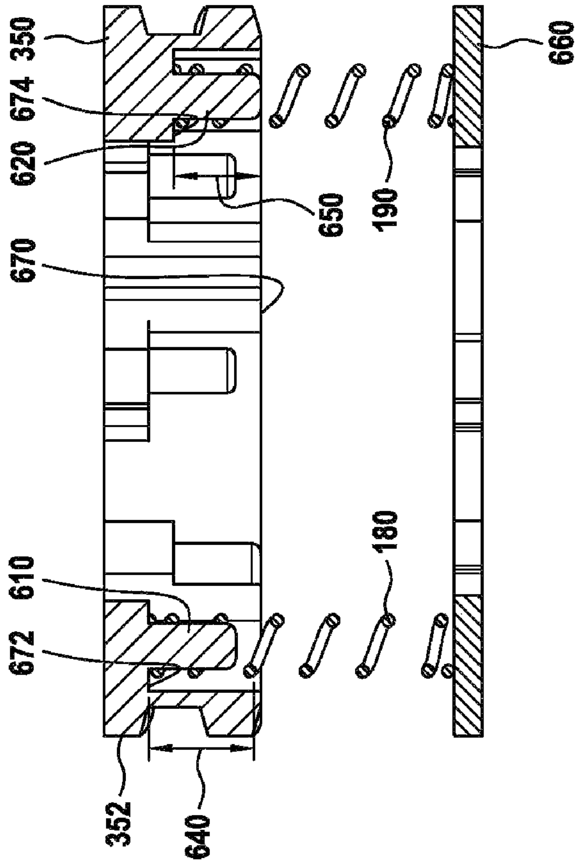

FIG. 6 shows the spring retaining ring 350 in FIG. 3 to FIG. 5 with spring elements 180, 190 associated thereto, according to another embodiment. By way of illustration, the spring retaining ring 350 comprises a first support bar 610 at a first distance 610 for arrangement of the first spring element 180 and a second support bar 620 at a second distance 650 for arrangement of the second spring element 190. By way of example, the support bars 610, 620 are cone-shaped.

Preferably, the first distance 640 is greater than the second distance 650. The distances 640, 650 are by way of illustration designed on an underside 670 of the spring retaining ring 350 facing the drive motor 140 to a contact surface 672, 674 facing the support bar 610, 620.

The spring elements 180, 190 are preferably arranged between the spring retaining ring 350 and a transmission element 660 or pressure plate associated with the torque coupling and facing the drive motor 140. These spring elements 180, 190 are designed as compression springs in the embodiment shown. The spring elements 180, 190 are preferably associated with the transmission element 660, or pressure plate biased in the direction of the drive motor 140. Preferably, at least one first spring element 180 and at least one second spring element 190, preferably a plurality of first and second spring elements 180, 190, are arranged circumferentially and evenly spaced apart.

It should be noted that the spring retaining ring 350 comprises two different spring elements. These can correspond to spring elements 180, 190, but can also be designed independently of spring elements 180, 190, i.e. have different spring rates. By designing the spring retaining ring 350 with different spring elements, a comparatively small output torque at a low motor speed, e.g. the first speed, can be easily enabled for precise applications. Furthermore, at a higher speed, e.g. the second speed, a comparatively larger output torque can be enabled.

Figure 7:
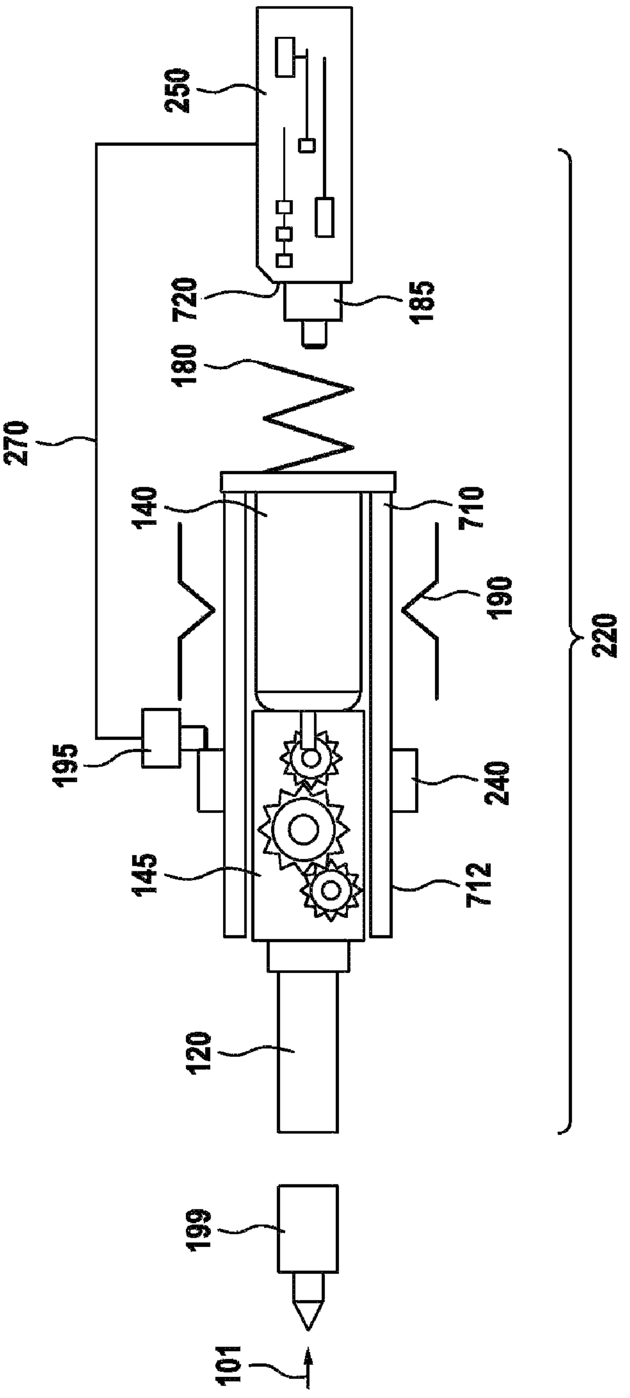

FIG. 7 illustrates the hand-held power tool 100 in FIG. 1 with the drive unit 220 thereof shown in FIG. 2 The drive unit 220 comprises at least the drive motor 140. Preferably, the drive unit 220 is associated with the transmission 145.

According to another embodiment, the drive unit 220 is arranged in a drive unit housing 710. The drive unit housing 710 is arranged within the elongate housing 110 in FIG. 1. Preferably, the drive unit housing 710 is provided for axially immovable arranging the tool receptacle 120 and the drive unit 220. The drive unit housing 710 is thereby movable along the longitudinal axis 128 in FIG. 1 relative to the control electronics means 250. Similar to FIG. 2, the control electronics means 250 are arranged at an end 102 (in FIG. 1) of the elongate housing 110 opposite the tool receptacle 120.

Moreover, the actuating element 240 is illustratively arranged on an outer circumference 712 of the drive unit housing 710. Furthermore, the second activation element 195 is exemplary arranged in the area of the actuating element 240. The second activation element 195 is in this case preferably fixedly arranged on the elongate housing 110. The spring element 190 associated with the second activation element 195 is arranged on the outer circumference 712 of the drive unit housing 710 in the embodiment shown. Preferably, the spring element 190 is designed as a leaf spring in FIG. 7.

Furthermore, the first activation element 185 is, e.g., arranged on an end face 720 of the control electronics means 250 facing the drive unit housing 710. The spring element 180 associated with the first activation element 710 is preferably arranged between the drive unit housing 710 and the control electronics means 250. The spring element 180 is in this case designed as a spiral spring.

It should be noted that the two activation elements 185, 195 can also be arranged interchangeably. The first activation element 185 can then be arranged in the area of the actuating element 240 and the second activation element 195 can be arranged on the end face 720 of the control electronics means 250, the spring element 180 being arranged as a leaf spring on the outer circumference 712 and the spring element 190 designed as a spiral spring being arranged between the drive unit housing 710 and the control electronics means 250. Moreover, the activation element arranged on the control electronics means 250, which is the first activation element 185 in FIG. 7, can also be arranged on the end face of the drive unit housing 710 facing the control electronics means 250.

When the tool receptacle 120 or the insertion tool 199 arranged therein is biased against a workpiece to be worked on, the spring element 180 is preferably first compressed, thus activating the first activation element 185. The drive motor 140 is thereby driven at the first speed. Upon further biasing, preferably the spring element 190 is additionally compressed and the second activation element 195 is activated. As a result, the drive motor 140 is driven at the second speed.

Figure 8:
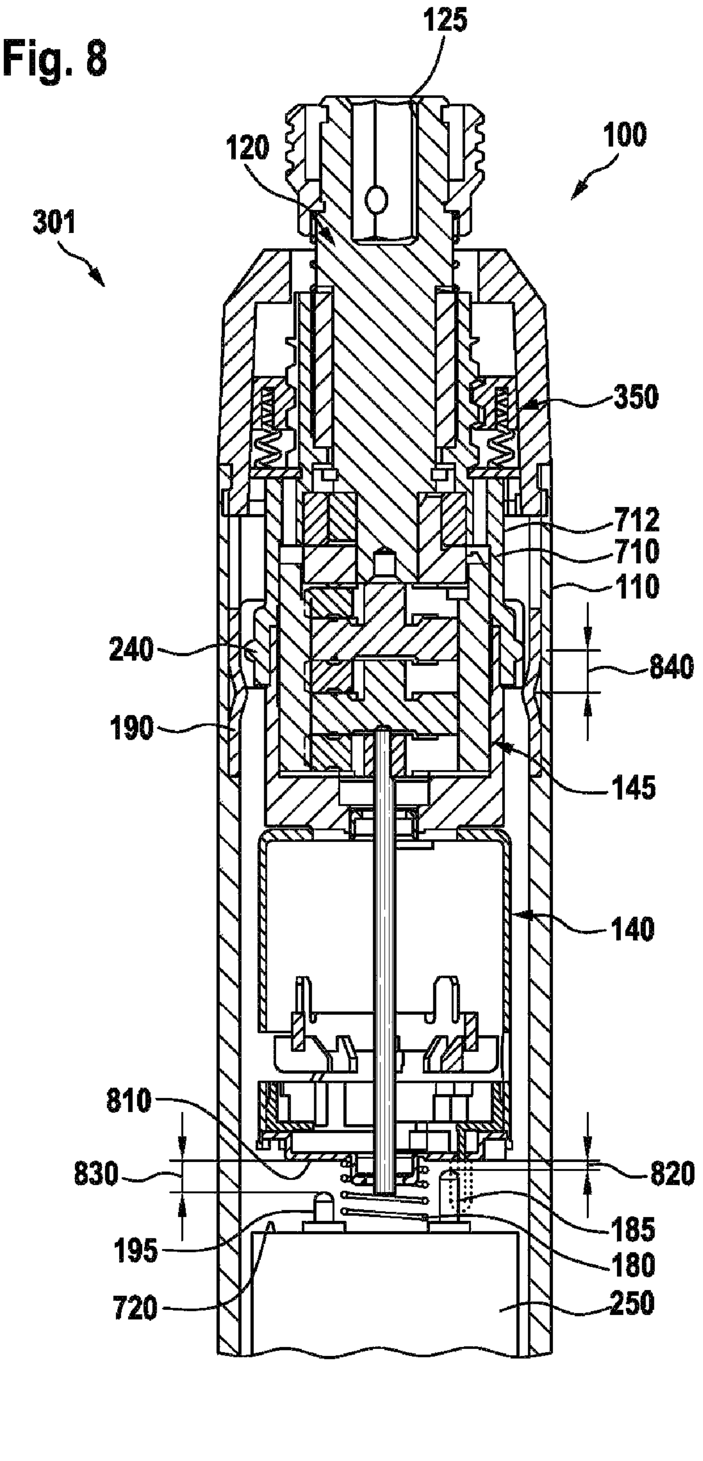

FIG. 8 shows the hand-held power tool 100 in FIG. 1 having the drive unit housing 710 in FIG. 7 at the rest position 301 in FIG. 3 with the activation unit 189 according to another embodiment. The actuating element 240 is in this case preferably designed integrally on the drive unit housing 710. Moreover, the spring element 190 is illustratively arranged on the outer circumference 712 of the drive unit housing 710, preferably attached to the elongate housing 110. Similar to the embodiment in FIG. 7, the spring element 190 is designed as a leaf spring.

In the embodiment shown in FIG. 8, the first and second activation elements 185, 195 are arranged on the end face 720 of the control electronics means 250. Similar to FIG. 7, the spring element 180 is arranged between the drive unit housing 710 and the control electronics means 250.

In the rest position 301 shown, a distance 840 is illustratively formed between the actuating element 240 and the spring element 190. Furthermore, a distance 820 is, e.g., formed between the activation element 185 and the drive unit housing 710, and a distance 830 is formed between the activation element 195 and the drive unit housing 710. Preferably, distance 830 is greater than distance 820.

Figure 9:
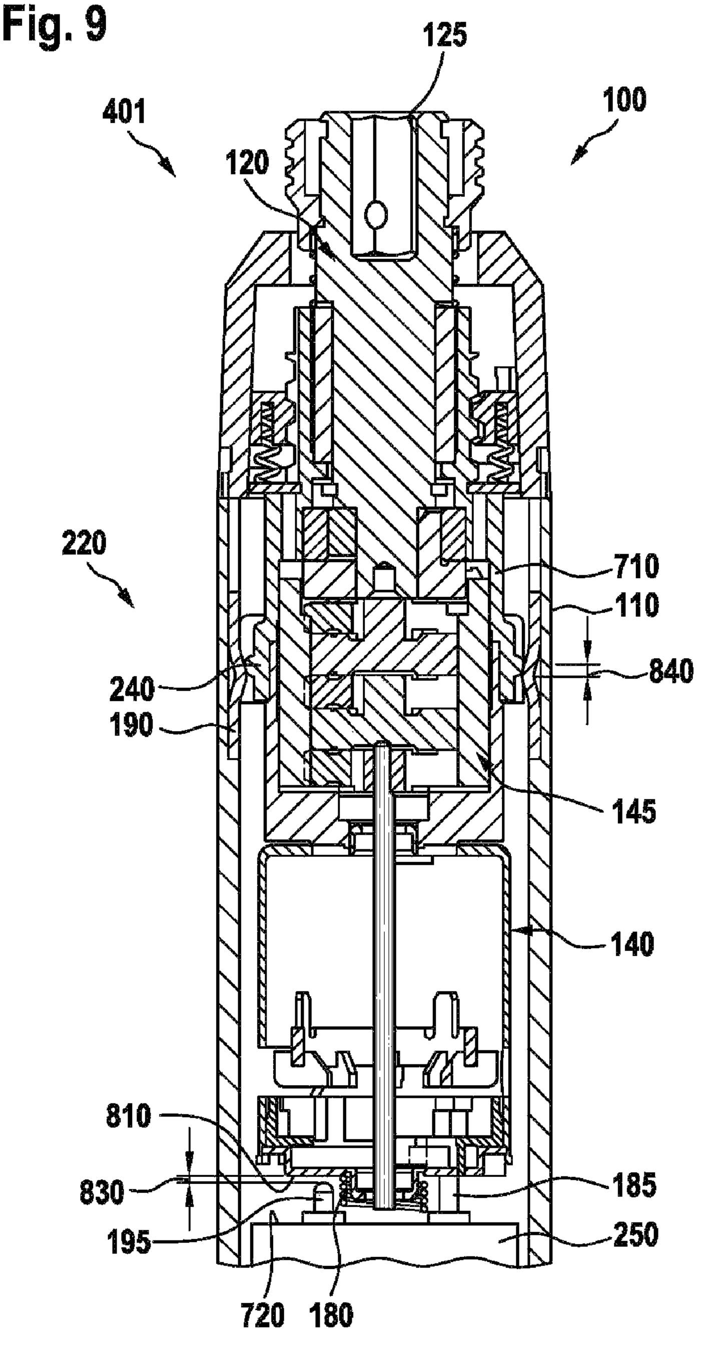

FIG. 9 shows the hand-held power tool 100 in FIG. 8 with drive motor 140 activated at the first speed stage 401 in FIG. 4, in which the drive motor 140 is driven at the first speed. The first activation element 185 is preferably activated thereby, and the spring element 180 is compressed. Moreover, the distance 840 between the actuating element 240 and the spring element 190, as well as the distance 830 between the activation element 195 and the drive unit housing 710, are each smaller than in FIG. 8.

To activate the drive motor 140 at the first speed, preferably the tool receptacle 120, or an insertion tool arranged therein, is biased against a workpiece to be worked on, thereby compressing the spring element 180 and thus activating the first activation element 185.

Figure 10:
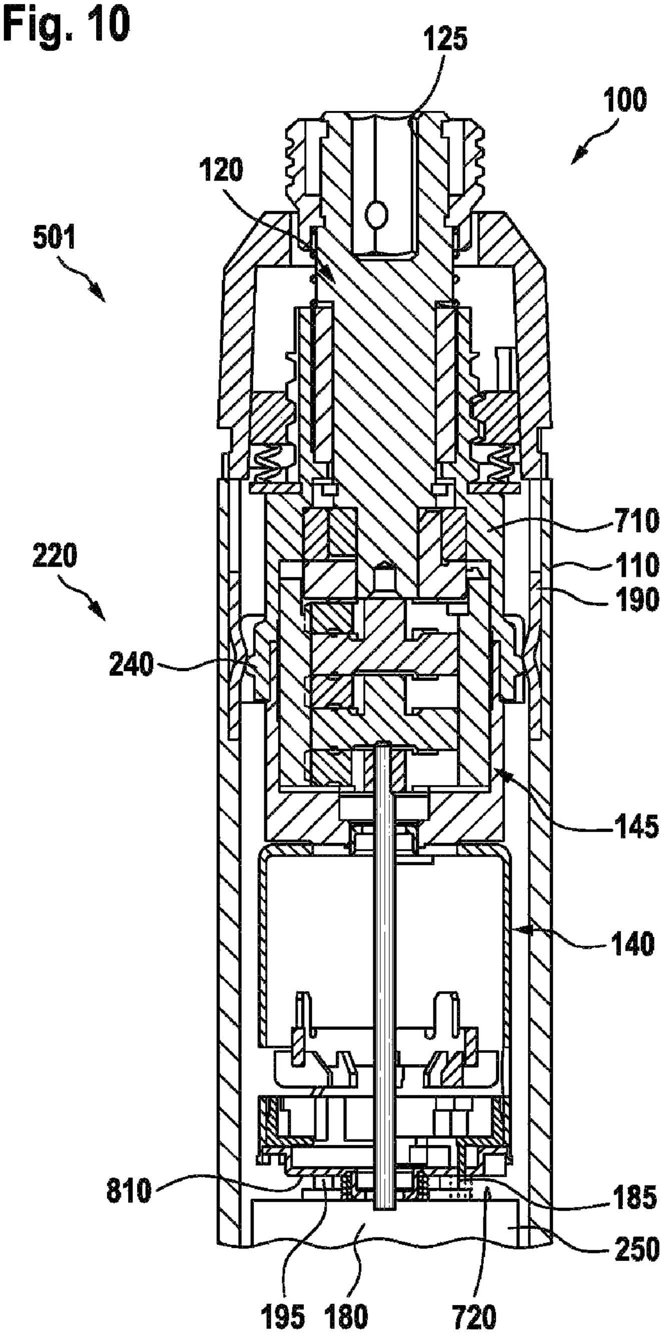

FIG. 10 shows the hand-held power tool 100 in FIG. 8 and FIG. 9 with drive motor 140 activated at the second speed stage 501 in FIG. 5, in which the drive motor 140 is driven at the first speed. The first activation element 185 and the second activation element 195 are in this case preferably activated, and the spring elements 180, 190 are both compressed. Moreover, the spring element 190 is illustratively biased by the actuating element 240.

To activate the drive motor 140 at the second speed, the tool receptacle 120 or an insertion tool arranged therein is preferably more strongly biased against a workpiece to be worked on in comparison to FIG. 9, whereby both spring elements 180, 190 are compressed and thus the second activation element 195 is activated.

Figure 11:
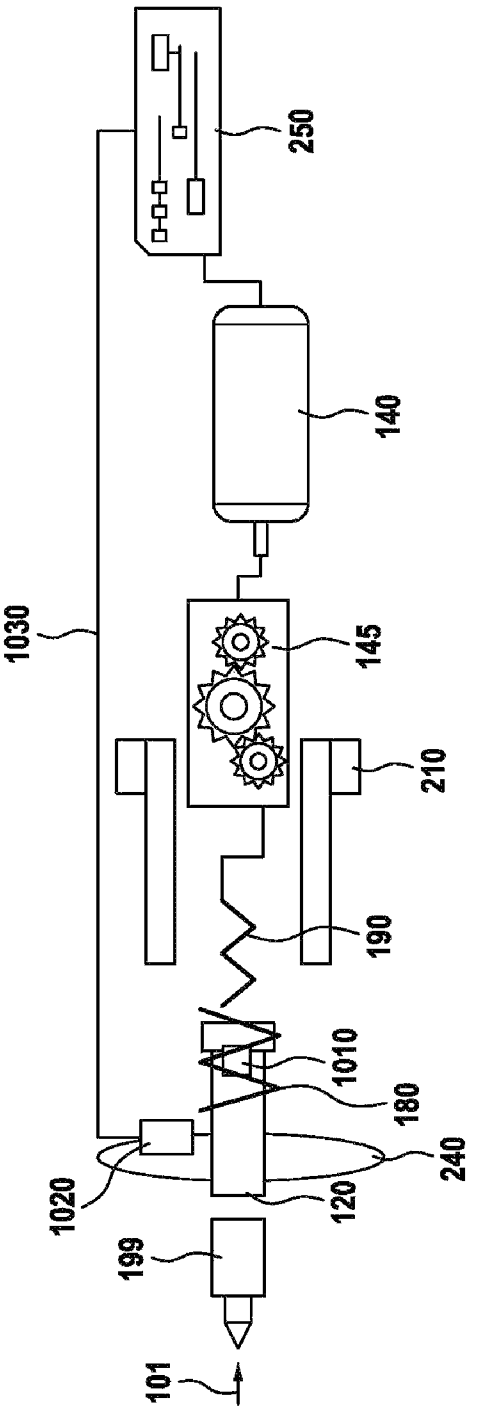

FIG. 11 shows the hand-held power tool 100 in FIG. 1 with its drive unit 220 in FIG. 2, in which the transmission 145 is arranged in the transmission housing 210. Furthermore, analogously to FIG. 2, the spring elements 180, 190 are arranged between the transmission 145 and the actuating element 240, wherein the first spring element 180 designed as a spiral spring is arranged in the internal receptacle 370 in FIG. 3 of the tool receptacle 120 and the second spring element 190 is arranged on the outer circumference 371 in FIG. 3 of the tool receptacle 120. According to an alternative embodiment, the first and/or second activation elements 185, 195 are designed as the sensor 1020.

Figure 12:
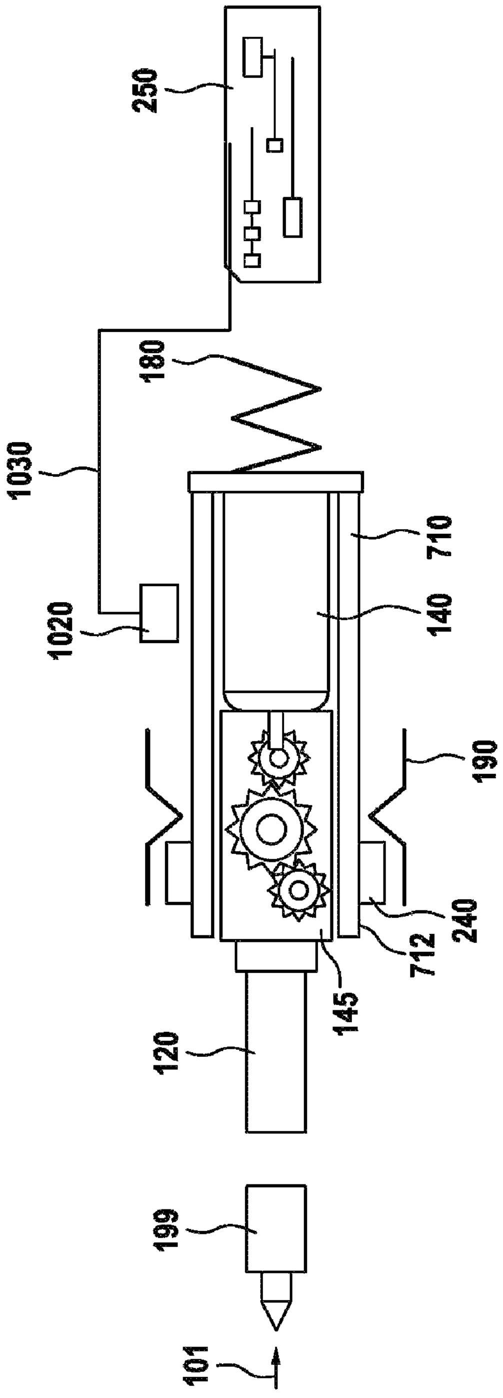

The sensor 1020 is preferably designed to detect movement of the tool receptacle 120 and/or the drive unit housing 710 in FIG. 12 of the drive unit 220 along the longitudinal axis 128 in FIG. 1. The control electronics means 250 in this case preferably controls a specified speed of the drive motor 140 as a function of a detected movement.

In FIG. 11, the sensor 1020 is, e.g., arranged on the actuating element 240. The sensor 1020 is preferably connected to the control electronics means 250 via a line 1030 and preferably sends an on/off signal to the control electronics means 250 therethrough. The sensor 1020 is illustratively associated with a magnet 1010 for detecting movement. The magnet 1010 is preferably arranged on the tool receptacle 120. It should be noted that the sensor 1020 can also be arranged on the tool receptacle 120 and the magnet 1010 can, e.g., be arranged on the actuating element 240.

To activate the drive motor 140 at the first speed, the tool receptacle 120, or the insertion tool 199 arranged therein, is biased against a workpiece to be worked on, whereby preferably the spring element 180 is compressed. As a result, the sensor 1020 preferably detects a movement relative to the tool receptacle 120, and the control electronics means 250 drives the drive motor 140 at the first speed as a result of the detected movement. If the tool receptacle 120 is to be subjected to further and stronger biasing, then the spring element 190 is preferably additionally compressed. This compression is detected by the sensor 120 and, due to the further movement relative to the tool receptacle 120, the control electronics means 250 preferably drive the drive motor 140 at the second speed.

Furthermore, the sensor 1020 can also be designed as a two-signal switch that sends a signal to the control electronics means 250 to output two different torques and speeds. Moreover, the sensor 1020 can, e.g., be designed as an infrared sensor that operates as a function of a respective detected distance from a workpiece being worked on.

FIG. 12 shows the hand-held power tool 100 in FIG. 1 with its drive unit 220 in FIG. 7, in which the drive unit 220 is arranged in the drive unit housing 710. Moreover, the actuating element 240 is arranged in a manner similar to FIG. 7, on the outer circumference 712 of the drive unit housing 710. The spring element 190 designed as a leaf spring is by way of illustration arranged on the outer circumference 712 of the drive unit housing 710, and the spring element 180 designed as a spiral spring is arranged between the drive unit housing 710 and the control electronics means 250.

The sensor 1020 designed as the activation element 185, 195 is preferably arranged in the area of the actuating element 240 and preferably fixed to the elongate housing 110. The sensor 1020 is in this case preferably designed to detect a movement of the drive unit housing 710 along the longitudinal axis 128 in FIG. 1. The control electronics means 250 in this case preferably controls a specified speed of the drive motor 140 as a function of a detected movement.

To activate the drive motor 140 at the first speed, preferably the tool receptacle 120, or the insertion tool 199 arranged therein, is biased against a workpiece to be worked on, whereby the spring element 180 is preferably compressed. As a result, the sensor 1020 preferably detects a movement relative to the tool receptacle 710, and the control electronics means 250 drives the drive motor 140 at the first speed as a result of the detected movement. If the tool receptacle 120 is to be subjected to further and stronger biasing, then the spring element 190 is preferably additionally compressed by the actuating element 240. This compression is detected by the sensor 120 and, due to the further movement relative to the drive unit housing 710, the control electronics means 250 preferably drives the drive motor 140 at the second speed.

It should be noted that all of the embodiments described can comprise the spring retaining ring 350 in FIG. 6. Furthermore, it should be noted that the first and second activation elements 185, 195 can comprise two different actuation variants: On the one hand, an activation by biasing, and, on the other hand, activation by actuating a separate switch, e.g. the switch 175 in FIG. 1. For example, according to one embodiment, the first speed can be activated via the first activation element 185 or a separate switch, and when the hand-held machine tool 100, in particular the tool holder 120, or an insert tool arranged therein, is acted upon against a workpiece to be worked on, the first speed is activated, or the drive motor 140 is operated at the first speed. If the second activation element 195 is then actuated or a separate switch is activated, the second speed is adjusted upon further biasing, e.g. against the transmission housing 210 in FIG. 2.

The invention claimed is:

1. A hand-held power tool comprising:

an elongate housing;

a drive unit having at least one drive motor, the drive unit arranged in the elongate housing;

a tool receptacle driven by the at least one drive motor, the tool receptacle configured to accommodate an insertion tool; and an activation unit configured to activate the at least one drive motor, wherein the activation unit has a first activation element configured to activate the at least one drive motor at a first speed in response to activation by the insertion tool, while located in the tool receptacle, acting upon a workpiece with a first force, and a second activation element configured to activate the at least one drive motor at a second speed in response to activation by the insertion tool, while located in the tool receptacle, acting upon the workpiece with a second force, the first speed less than the second speed, wherein the tool receptacle is movable along a longitudinal axis relative to the at least one drive motor in order to activate at least one of the first activation element and the second activation element, and wherein a separate switch is associated with the first and/or second activation elements, and activation of the drive motor at the respective first and/or second speed associated with the first and/or second activation elements occurs by an operation of the separate switch by a user.

2. The hand-held power tool according to claim 1, wherein the first and second activation elements are arranged on a transmission housing associated with the drive unit.

3. The hand-held power tool according to claim 1, wherein:

a drive unit housing is arranged within the elongate housing, the drive unit housing configured to arrange the tool receptacle and the drive unit in an axially immovable manner relative to one another, the drive unit housing is movable along a longitudinal axis relative to control electronics, and the control electronics are arranged on an end of the elongate housing opposite the tool receptacle.

4. The hand-held power tool according to claim 3, wherein the first activation element is arranged on the drive unit housing.

5. The hand-held power tool according to claim 3, wherein the second activation element is arranged along the longitudinal axis between the drive unit and the control electronics.

6. The hand-held power tool according to claim 3, wherein the first and second activation elements are arranged along the longitudinal axis between the drive unit and the control electronics.

7. The hand-held power tool according to claim 1, wherein:

a first spring element is associated with the first activation element, and a second spring element is associated with the second activation element, the first and second spring elements have different spring rates, and the first and second spring elements are compressible by being acted upon in order to enable actuation of the first or second activation elements, thereby activating the at least one drive motor at the respective first or second speed associated with the respective first or second activation element.

8. The hand-held power tool according to claim 7, wherein at least one of the first and second spring elements is arranged on an outer circumference of the tool receptacle, on an internal receptacle of the tool receptacle, on an outer circumference of a drive unit housing of the drive unit, and/or between the drive unit and control electronics, which are arranged on an end of the elongate housing opposite the tool receptacle.

9. The hand-held power tool according to claim 7, wherein at least one of the first and second spring elements is designed as a spiral spring or leaf spring.

10. The hand-held power tool according to claim 7, further comprising:

a spring retaining ring having a first support bar at a first distance for arrangement of the first spring element, and a second support bar at a second distance for arrangement of the second spring element, wherein the first distance is greater than the second distance.

11. The hand-held power tool according to claim 1, wherein:

at least one of the first and second activation elements is designed as a sensor that detects a movement of the tool receptacle and/or a drive unit housing of the drive unit along a longitudinal axis, and control electronics control a specified speed of the at least one drive motor as a function of the detected movement.

12. The hand-held power tool according to claim 1, wherein at least one of the first and second activation elements is designed as an on or off switch.

13. The hand-held power tool according to claim 1, wherein the hand-held power tool is a screwdriver.

14. The hand-held power tool according to claim 1, wherein the at least one drive motor is activated by the insertion tool acting upon the workpiece along a longitudinal axis of the elongate housing.

15. The hand-held power tool according to claim 2, wherein the first and second activation elements are arranged on an end face of the transmission housing facing the tool receptacle.

16. A hand-held power tool comprising:

an elongate housing;

a drive unit having at least one drive motor, the drive unit arranged in the elongate housing;

a tool receptacle driven by the at least one drive motor, the tool receptacle configured to accommodate an insertion tool; and an activation unit configured to activate the at least one drive motor, wherein;

the activation unit has a first activation element configured to activate the at least one drive motor at a first speed in response to activation by the insertion tool, while located in the tool receptacle, acting upon a workpiece with a first force, and a second activation element configured to activate the at least one drive motor at a second speed in response to activation by the insertion tool, while located in the tool receptacle, acting upon the workpiece with a second force, the first speed less than the second speed, a first spring element is associated with the first activation element, and a second spring element is associated with the second activation element, the first and second spring elements have different spring rates, and the first and second spring elements are compressible by being acted upon in order to enable actuation of the first or second activation elements, thereby activating the at least one drive motor at the respective first or second speed associated with the respective first or second activation element.

17. The hand-held power tool according to claim 16, wherein at least one of the first and second spring elements is arranged on an outer circumference of the tool receptacle, on an internal receptacle of the tool receptacle, on an outer circumference of a drive unit housing of the drive unit, and/or between the drive unit and control electronics, which are arranged on an end of the elongate housing opposite the tool receptacle.

* * * * *